United States Patent [19]

Shuler et al.

[11] Patent Number: 5,719,779
[45] Date of Patent: Feb. 17, 1998

[54] AUDIO AND VIDEO TRANSMISSION FROM A FUEL STATION STORE TO A FUEL PUMP COMMUNICATION UNIT

[75] Inventors: Walter Tuttle Shuler; Joseph Daniel Long; Howard Marion Myers, all of Greensboro, N.C.

[73] Assignee: Gilbarco Inc., Greensboro, N.C.

[21] Appl. No.: 769,645

[22] Filed: Dec. 17, 1996

Related U.S. Application Data

[63] Continuation of Ser. No. 237,748, May 3, 1994, abandoned.
[51] Int. Cl.[6] ............................ G06F 17/06; G06G 7/48
[52] U.S. Cl. .................... 364/479; 340/933; 235/381; 364/465
[58] Field of Search .......................... 340/933; 364/424, 364/479, 465, 405; 358/143; 379/53; 235/381; 222/28

[56] References Cited

U.S. PATENT DOCUMENTS

| | | | |
|---|---|---|---|
| 4,107,777 | 8/1978 | Pearson et al. | 364/465 |
| 4,395,627 | 7/1983 | Barker et al. | 235/381 |
| 4,589,069 | 5/1986 | Endo et al. | 364/405 |
| 4,629,031 | 12/1986 | Kato et al. | 181/204 |
| 4,630,754 | 12/1986 | Komukai | 222/28 |
| 4,887,158 | 12/1989 | Guichard et al. | 358/143 |
| 4,891,704 | 1/1990 | Vonk et al. | 358/143 |
| 4,955,048 | 9/1990 | Iwamura et al. | 379/53 |
| 5,027,282 | 6/1991 | Hollidge | 364/479 |
| 5,072,297 | 12/1991 | Kanazawa et al. | 358/143 |
| 5,299,135 | 3/1994 | Lieto et al. | 364/479 |

FOREIGN PATENT DOCUMENTS

| | | |
|---|---|---|
| 39 385 | 2/1981 | European Pat. Off. . |
| 4216817 | 12/1993 | Germany . |
| 1482986 | 8/1977 | United Kingdom . |
| 9409457 | 4/1994 | WIPO . |

OTHER PUBLICATIONS

IEEE Transactions On Consumer Electronics; vol. 33, No. 4, Nov., 1987.

*Primary Examiner*—Reba I. Elmore
*Assistant Examiner*—Shiela S. Rao
*Attorney, Agent, or Firm*—Rhodes Coats & Bennett, L.L.P.

[57] ABSTRACT

A fuel station communication system used to transmit audio and video information to customers at fuel pumps. The fuel station communication system includes a transmitter located in a station store and a receiver having a communication unit located at a fuel pump. A wire pair connects the transmitter and receiver together for transmitting audio and video signals from the transmitter to the receiver. To provide for simultaneous transmission of the audio and video signals over the wire pair, the transmitter includes a modulator and signal summer. The modulator modulates the audio signal above the video signal, and the signal summer adds the modulated audio signal and the video signal together to form a combined, audio-video signal. A differential line driver and differential line receiver are connected to provide transmission of the audio-video signal from the transmitter to the receiver. The receiver includes a demodulator for converting the audio-video signal to separate audio and video signals for input into a communication unit located at the fuel pump. To electrically isolate the transmitter and receiver, optical couplers are disposed in the transmitter and receiver and separate power supplies are provided for portions of the transmitter and receiver.

43 Claims, 1 Drawing Sheet

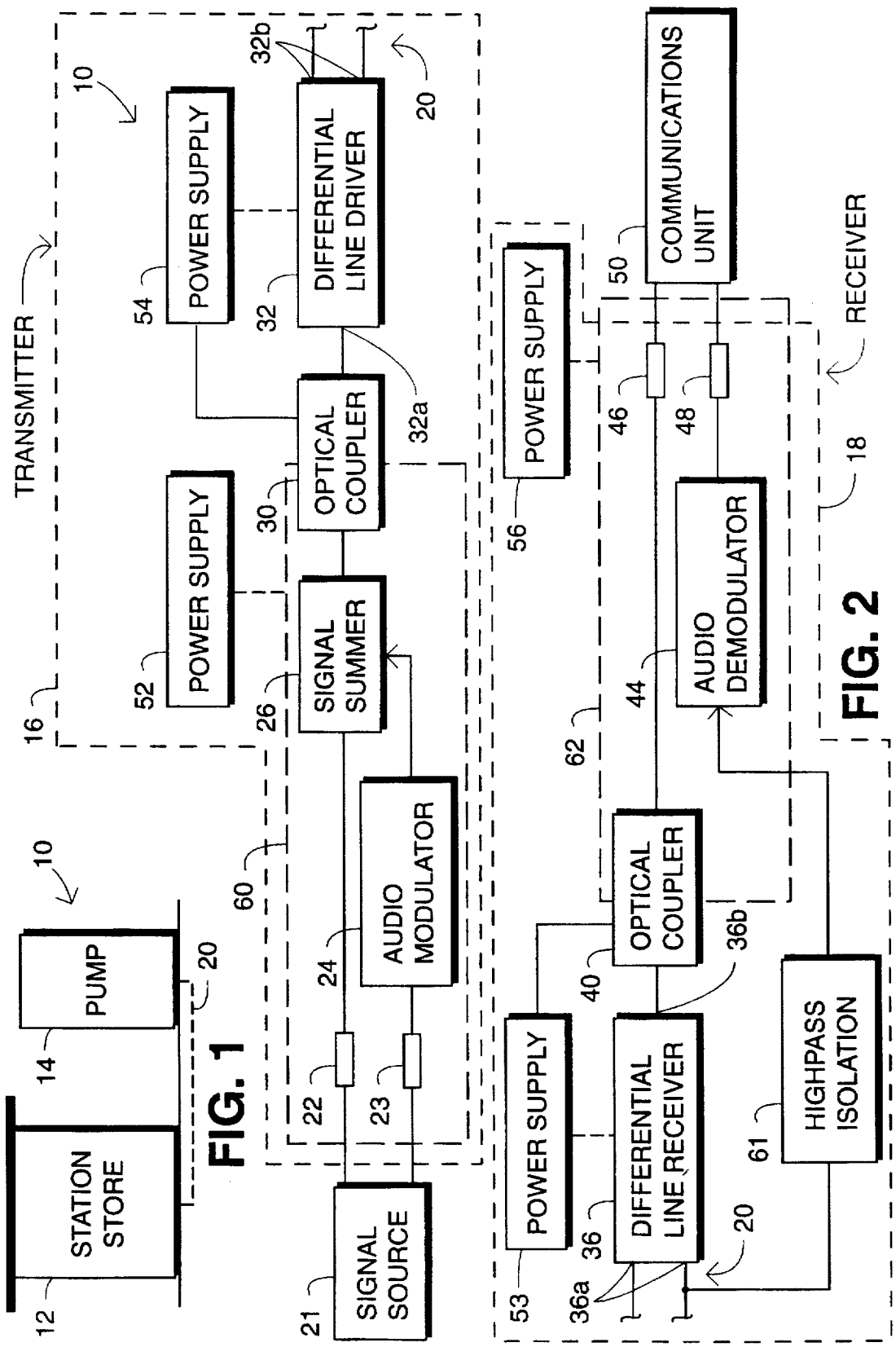

AUDIO AND VIDEO TRANSMISSION FROM A FUEL STATION STORE TO A FUEL PUMP COMMUNICATION UNIT

This application is a continuation of application Ser. No. 08/237,148 filed May 3, 1994 now abandoned.

FIELD OF THE INVENTION

The present invention relates generally to a fuel station communication system for communicating information to a customer at a fuel pump, and more particularly to a fuel station communication system for transmitting audio and video information from a station store to a communication unit located at a fuel pump.

BACKGROUND OF THE INVENTION

Recent advances in fuel station designs have included the addition of audio/video displays in fuel dispensers (often called pumps). Such communication systems are used to transmit audio and video information to customers at the fuel pumps. These communication systems typically include a transmitter located in a service station store and a receiver having a communication unit located at or in a fuel pump. The transmitter and receiver are connected together by a coaxial wire. A station attendant, or as is more usual, software-controlled apparatus operates the transmitter from inside the station store to send audio and video signals to the receiver. The audio and video signals are used by the receiver to display and announce information to a customer at the fuel pump.

There are several problems with fuel station communication systems of the prior art. First, communication systems presently proposed for use in fuel stations are relatively expensive to install. One substantial expense in installing such a communication system is the coaxial wire used to connect the transmitter to the receiver. Because the coaxial wire may be exposed to gasoline and oil, a gasoline and oil resistant coaxial wire must be used. Gasoline and oil resistant coaxial wire is expensive and difficult to obtain.

Second, the audio and video signals of fuel station communication systems may become degraded when transmitted over the coaxial wire. Degradation of the signals results in low quality video and acoustical information being provided to the customer by the communication unit. In order to prevent degradation of the transmitted signals and provide high quality audio and video signals to the communication unit, expensive components must be included to modulate the audio and video signals to near broadcast frequencies and then to demodulate the signals at the receiver.

Third, the quality of audio and video signals transmitted over the non-coaxial wire in fuel station communication systems is also very susceptible to electrical noise. In particular, such wire cannot be run adjacent to wires used to power fuel pumps and other equipment at the service station without resulting in substantial degradation of the audio and video signals. The expense of the communication system is accordingly increased due to the need to use coaxial wire and to isolate it from other wiring at the service station.

Fourth, fuel station communication systems are also susceptible to wiring faults. Wiring faults can result in costly damage to the transmitter, receiver or to personnel in the hazardous fuel dispensing environment.

Accordingly, there is a need in the art for improvements in communications between the transmitter and receiver to overcome these problems.

SUMMARY OF THE INVENTION

The present invention provides a fuel station communication system that solves the above-discussed problems of prior art systems. The fuel station communication system is used to economically and safely transmit audio and video information from a transmitter located in a station store to a receiver having a communication unit at a fuel pump. Audio and video signals are simultaneously transmitted from the transmitter to the receiver over a single wire pair to provide audio and video information to a customer at a pump.

To provide for simultaneous transmission of the audio and video signals over a single wire pair, the transmitter includes a modulator for modulating an audio signal to a frequency above a video signal. The modulated audio signal and the video signal are then added together by a signal summer to form a combined audio-video signal. The audio-video signal is transmitted by the transmitter such that audio and video signals in effect are transmitted simultaneously across the single wire pair to the receiver. The receiver includes a demodulator for the audio signal. The separated audio and video signals are used by the communication unit to communicate audio and video information to the customer located at the fuel pump.

The transmitter and receiver are protected from wiring faults that could result in damage to equipment and safety concerns for customers by optical couplers placed at the downstream part of the transmitter and at the upstream part of the receiver so as to electrically isolate most of the components of the transmitter and receiver. The wire pair used for the signal transmission extends between a differential line driver and a differential line receiver connected to the optical couplers. In addition, the transmitter and receiver are powered by separate, isolated power supplies. Electrically isolating the transmitter and receiver helps prevent the transmitter and receiver from being damaged due to electrical malfunctions and also helps protect customers using the fuel pumps from danger due to wiring faults.

The fuel station communication system of the present invention has several advantages over systems of the prior art. The wire pair used to transmit the audio and video signals is less expensive than coaxial wire. In a fuel station environment, signal transmission wire needs to be resistant to gas and oil. Wire pair that is resistant to gas and oil is readily available and relatively inexpensive, but coaxial cable that is gas and oil resistant is relatively expensive and difficult to obtain.

Wire pairs are noise immune if common mode noise is rejected at the receiver. Therefore, the wire pair in the fuel station communication system can be run side-by-side with power and other signal wiring used at the service station, making possible the use of existing AC power wiring conduits at service stations.

The fuel station communication system of the present invention is also less expensive to install because only a single wire pair is required to simultaneously transmit the audio and video signals. Accordingly, separate wire pairs for the audio and video signals do not have to be run between the transmitter and receiver.

BRIEF DESCRIPTION OF THE DRAWINGS

FIG. 1 is an overall schematic view of the fuel station communication system of the present invention.

FIG. 2 is a schematic illustration of the transmitter and receiver that forms a part of the communication system of the present invention.

DETAILED DESCRIPTION OF THE PREFERRED EMBODIMENT

Referring to the drawings, the fuel station communication system of the present invention is shown and indicated generally by the numeral 10. Fuel station communication system 10 allows a station attendant, or, more preferably, a video signal source, located in a service station store 12 to communicate to a customer located at a fuel dispenser or pump 14. As seen in FIG. 2, fuel station communication system 10 generally includes a transmitter 16 located in the store 12, a receiver 18 positioned adjacent or located within fuel pump 14, and a wire pair 20 connecting the transmitter 16 to the receiver 18.

A signal source 21 produces electrical audio and video signals for transmission to receiver 18. Signal source 21 can be any device that produces audio and video signals such as a conventional VCR or laser disk. The video and audio signals from signal source 21 are fed into a video input 22 and an audio input 23, respectively, for processing by transmitter 16.

The signalling capabilities may be based on technologies such as that disclosed in any of the following patents, the disclosures of which are hereby incorporated by reference: U.S. Pat. No. 4,629,031 to Vayda et al.; U.S. Pat. No. 4,589,069 to Endo et al.; U.S. Pat. No. 4,630,754 to Komukai; and U.S. Pat. No. 5,027,282 to Hollidge. More preferably, the signalling uses the techniques disclosed in U.S. patent application Ser. No. 07/960,512 filed 13 Oct. 1992 in the name of Leatherman et al. entitled "Multimedia Video/Graphics in Fuel Dispensers" and/or U.S. patent application Ser. No. 07/959,844 filed 13 Oct. 1992 in the name of Long entitled "Synchronization of Prerecorded Audio/Visual Signals with Multimedia Controllers" and/or U.S. patent application Ser. No. 07/960,515 filed 13 Oct. 1992 in the name of Atchley entitled "Video Display Control," the disclosures of which are hereby incorporated herein by reference.

Transmitter 16 processes the audio and video signals so that they can be simultaneously transmitted over wire pair 20. To process the audio and video signals for simultaneous transmission, an audio modulator 24 is connected to the audio input 23. Audio modulator 24 modulates the input audio signal to a frequency above the base-band frequency of the video signal. The modulated audio signal and the video signal are then directed into a signal summer 26. Signal summer 26 combines the modulated audio signal and video signal to form a combined audio-video signal. These forms of modulation and summing are, at least individually, very well known to those of ordinary skill in the art and therefore need no extensive description here.

Transmitter 16 is connected to wire pair 20 for transmitting the audio-video signal to receiver 18. Wire pair 20 includes two wires twisted together and is of the type commonly used for telephony.

As shown in FIG. 2, the signal summer 26 supplies the audio-video signal to an optical coupler 30. Optical coupler 30 converts the electrical audio-video signal from the summer 26 to an optical signal and then reconverts the optical signal to an electrical audio-video signal for transmission. By initially passing the audio-video signal through optical coupler 30, the upstream portions of transmitter 16 (i.e. the inputs 22 and 23, the modulator 24 and the summer 26) are electrically isolated from electrical components located downstream from transmitter 60. Electrical surges caused by wiring faults or other malfunctions are thus prevented from reaching the upstream portions 60 by optical coupler 30. This protects the portions 60 and upstream components from expensive damage that could otherwise result from electrical malfunctions on one or the other side of the coupler.

After passing through optical coupler 30, the audio-video signal is applied to a differential line driver 32. Differential line drivers of any suitable conventional design may be used. Differential line driver 32 connects optical coupler 30 to wire pair 20 and acts to amplify the audio-video signal for transmission. In the preferred embodiment, differential line driver 32 has a single-ended input 32a and a double-ended output 32b. The audio-video signal transmitted from optical coupler 30 is a single-ended signal and is transmitted into the single-ended input 32a of differential line driver 32. Differential line driver 32 amplifies the audio-video signal and converts the audio-video signal into a double-ended signal. A differential audio-video signal is output from double-ended output 32b of differential line driver 32 for transmission to receiver 18.

The audio-video signal is transmitted over the wire pair 20 to a differential line receiver 36 at the upstream end of receiver 18. Upstream of the differential line receiver 36, the audio component of the signal is allowed to pass through a highpass and fault isolation unit 61, the output of which is sent on to the audio demodulator 44. The isolation circuit 61 includes two capacitors in series whose value is dependent on the modulated audio frequency. Differential line receiver 36 has a double-ended input 36a and a single-ended output 36b. The audio-video signal is accepted into the double-ended input 36a of differential line receiver 36 and converted to a suitable single-ended signal for use in the receiver 18.

An optical coupler 40 is positioned downstream from differential line receiver 36. Optical coupler 40 receives the single ended video signal from differential line receiver 36. Optical coupler 40 converts this electrical signal to an optical signal and then reconverts the optical signal back into an electrical video signal. Passing the video signal through optical coupler 40 electrically isolates the downstream portions 62 of the receiver 18 from the other components in fuel station communication system 10.

The signal received by downstream portion 62 from the high pass and fault isolation unit 61 is passed through an audio demodulator 44. The high pass unit protects against any electrical surges or malfunctions on wire pair 20. The separated audio and video signals are equivalent to the audio and video signals originally output from signal source 21. The video signal and audio signal are then individually directed to video output 46 and audio output 48, respectively. Video output 46 and audio output 48 are connected to a communication unit 50, like a television monitor, which uses the audio and video signals to display video information and to announce information to a customer at the pump 14. The preferred communication unit is a Full Screen System™ marketed by Glibarco, Inc. of Greensboro, N.C. USA.

As shown in FIG. 2, communication system 10 is powered by power supplies 52, 53, 54, 56. Power supplies 52, 53, 54, 56 are isolated from one another to electrically isolate the transmitter 16 and receiver 18. Power supply 52 is connected to the upstream portion 60 of transmitter 16; power supply 53 is connected to differential line receiver 36 and optical coupler 40; power supply 54 is connected to differential line driver 32 and optical coupler 30; and power supply 56 is connected to the downstream portion 62 of receiver 18. By powering the components of communication system 10 with individual power supplies, transmitter 16 and receiver 18 are protected from electrical malfunctions that may occur along wire pair 20.

In operation, fuel station communication system 10 operates as follows. A station operator or suitable electronics such as a software-controlled microprocessor in store 12 activates a signal source 21 such as a VCR. The signal source 21 produces audio and video signals that represent information to be displayed and announced to customers at pump 14 by communications unit 50. The audio and video signals are processed by transmitter 16 to form an audio-video signal.

The audio-video signal is transmitted from transmitter 16 to receiver 18 over wire pair 20. After initially being transmitted from the upstream portion 60, the audio-video signal passes through optical coupler 30 to isolate portion 60. Isolating portion 60 protects it from electrical damage caused by wire faults and other malfunctions occurring downstream in transmitter 16 and along wire pair 20. Wire pair 20 extends from differential line driver 32 to differential line receiver 36 located in or adjacent fuel pump 14. The audio-video signal is transmitted from differential line driver 32 to differential line receiver 36 at the upstream portion of receiver 18. Differential line receiver 36 transmits the audio-video signal to downstream portion 62 through optical coupler 40, which acts, to isolate the downstream portion 62 to protect it from electrical damage caused by wire faults and other malfunctions occurring upstream in receiver 18 and along wire pair 20.

The audio-video signal supplied to receiver 18 is processed to convert the audio-video signal into separate audio and video signals that are equivalent to the audio and video signal originally produced by signal source 21. The separated audio and video signals are then input into communication unit 50, which uses them to supply audio and video information to a customer at the pump.

Fuel station communication system 10 provides an economical and effective system for transmitting audio and video signals from transmitter 16 located in station store 12 to receiver 18 located at fuel pump 14. Only a single wire pair 20 is needed to transmit audio and video signals from the transmitter 16 to receiver 18. This reduces the overall cost of fuel station communication system 10. Optically isolating portions 60 and 62 and providing separate power supplies 52, 53, 54, 56 helps protect transmitter 16 and receiver 18 from electrical damage due to electrical faults.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. A fuel dispensing and fuel station analog communication system for dispensing fuel and communicating audio and video information to a customer via analog circuitry, comprising:
   a fuel pump for dispensing fuel to a vehicle;
   an audio signal source:
   a video signal source;
   a transmitter disposed at a location remote from the fuel pump and having an analog audio input for receiving an analog audio signal from said audio signal source and an analog video input for receiving a analog video signal from said video source, the transmitter including:
   a modulator adapted for modulating one of said analog audio and video signals to form a modulated analog signal, and
   a signal summer adapted for combining said modulated analog signal and the other of said analog audio and video signals to form a combined analog audio-video signal whereby only a single analog signal is left for transmission by said transmitter;
   a receiver and a communication unit located at the fuel pump, said receiver adapted for receiving the audio-video signal transmitted by the transmitter and said communication unit including audio and video output devices adapted for presenting said audio-video transmissions to the customer, the receiver including a demodulator for converting the modulated analog signal into a signal in its original frequency band, wherein the communication unit converts the analog audio and video signals to audio and video information for display and announcement to the customer located at the fuel pump;
   a twisted wire pair adapted for use alongside AC power lines with noise immunity, said twisted wire pair connecting the transmitter and receiver and carrying the analog audio-video signal from the transmitter to the receiver; and
   a first optical coupler disposed downstream from the modulator for electrically isolating at least a portion of the receiver in order that electrical faults are not propagated along the communication system.

2. The fuel dispensing and fuel station communication system of claim 1 further including a second optical coupler disposed downstream from the modulator for electrically isolating at least a portion of the transmitter.

3. The fuel dispensing and fuel station communication system of claim 2 further including a line driver located downstream from the second optical coupler for amplifying the audio-video signal for transmission over the wire pair.

4. The fuel dispensing and fuel station communication system of claim 3 wherein the line driver is a differential line driver having a single-ended input and a double-ended output.

5. The fuel dispensing and fuel station communication system of claim 4 wherein an upstream portion of the transmitter is connected to a first power supply such that the upstream portion is powered separately from the line driver and receiver.

6. The fuel dispensing and fuel station communication system of claim 5 further including a line receiver located upstream from the first optical coupler, wherein the line receiver is a differential line receiver having double-ended input and single-ended output.

7. The fuel dispensing and fuel station communication system of claim 6 wherein a downstream portion of the receiver is connected to a second power supply such that the downstream portion is powered separately from the line receiver and transmitter.

8. The fuel dispensing and fuel station communication system of claim 1 wherein the modulator modulates the analog audio signal to a frequency above the analog video signal frequency in order to form separate and distinct analog audio and video frequencies.

9. The fuel dispensing and fuel station communication system of claim 1 wherein said receiver further comprises a highpass isolation unit to pass a portion of said combined signal to said demodulator.

10. A fuel station analog communication system for communicating via analog circuitry information from a remote location to a customer located at a fuel pump, comprising:

a analog transmitter disposed at a location remote from the fuel pump and having an audio input for receiving an analog audio signal and a video input for receiving a analog video signal, the transmitter including:

a modulator adapted for modulating one of said analog audio and video signals to form a modulated analog signal having a frequency above the other of said analog audio and video signals in order that both of said analog audio and video signals have separate and distinct frequencies, and a signal summer adapted for combining said modulated analog signal and the other of said analog audio and video signals to form a combined analog audio-video signal whereby transmission circuitry layout is simplified and installation costs reduced since only a single analog signal is left for transmission by said transmitter;

a receiver and a communication unit located at the fuel pump, said receiver adapted for receiving the analog audio-video signal transmitted by the transmitter and said communication unit including audio and video output devices adapted for presenting said audio-video transmissions to the customer, the receiver including a demodulator for converting the modulated analog signal into a signal in its original frequency band, wherein the communication unit converts the analog audio and video signals to audio and video information for display and announcement to the customer located at the fuel pump;

a twisted wire pair adapted for use alongside AC power lines and having noise immunity, said twisted wire pair connecting the transmitter and receiver and carrying the analog audio-video signal from the transmitter to the receiver; and a first optical coupler disposed downstream from the modulator for electrically isolating at least a portion of the receiver in order that electrical faults are not propagated along the communication system.

11. The fuel station communication system of claim 10 further including a second optical coupler disposed downstream from the transmitter for electrically isolating at least a portion of the transmitter.

12. The fuel station communication system of claim 11 further including a line driver located downstream from the first optical coupler for amplifying the audio-video signal for transmission over the wire pair.

13. The fuel dispensing and fuel station communication system of claim 12 wherein the line driver is a differential line driver having a single-ended input and a double-ended output.

14. The fuel dispensing and fuel station communication system of 13 wherein an upstream portion of the transmitter is connected to a first power supply such that the upstream portion is powered separately from the line driver and receiver.

15. The fuel dispensing and fuel station communication system of claim 14 further including a line receiver located upstream from the first optical coupler, wherein the line receiver is a differential line receiver having double-ended input and single-ended output.

16. The fuel dispensing and fuel station communication system of claim 15 wherein a downstream portion of the receiver is connected to a second power supply such that the downstream portion is powered separately from the line receiver and the transmitter.

17. The fuel dispensing and fuel station communication system of claim 10 wherein the modulator modulates the analog audio signal to a frequency above the analog video signal frequency in order to form separate and distinct analog audio and video frequencies.

18. A fuel station analog communication system for communicating information to a customer located at a fuel pump, comprising:

analog transmitter disposed at a location remote from the fuel pump for transmitting a combined analog audio-video signal;

a receiver and a communication unit located at the fuel pump, said receiver adapted for receiving the analog audio-video signal transmitted by the transmitter and said communication unit adapted for presenting said audio-video transmissions by display and announcement to the customer located at the fuel pump and communication unit; and a twisted wire pair adapted for use alongside AC power lines and having noise immunity, said twisted wire pair connecting the transmitter and receiver and carrying the analog audio-video signal from the transmitter to the receiver.

19. The fuel station analog communication system of claim 18 further including a first optical coupler disposed upstream from the receiver for electrically isolating the receiver in order that electrical faults are not propagated along the communication system.

20. The fuel station communication system of claim 19 further including a second optical coupler disposed downstream from the transmitter for electrically isolating the transmitter.

21. The fuel station communication system of claim 20 further including a line driver located downstream from the first optical coupler for amplifying the audio-video signal for transmission over the wire pair.

22. The fuel station analog communication system of claim 21 wherein the line driver is a differential line driver having a single-ended input and a double-ended output.

23. The fuel station analog communication system of 21 wherein an upstream portion of the transmitter is connected to a first power supply such that the upstream portion is powered separately from the analog line driver and the receiver whereby less power is required and additional safety achieved in contrast to powering said transmitter, analog line driver, and receiver jointly.

24. The fuel station analog communication system of claim 23 further including a analog line receiver located upstream from the second optical coupler, wherein the analog line receiver is a differential line receiver having double-ended input and single-ended output.

25. The fuel station analog communication system of claim 23 wherein a downstream portion of the receiver is connected to a second power supply such that the downstream portion is powered separately from the line receiver and the transmitter whereby less power is required and additional safety achieved in contrast to powering said transmitter, analog line receiver, and receiver jointly.

26. The fuel station analog communication system of claim 18 wherein the analog transmitter includes a modulator and said modulator modulates the analog audio signal to a frequency above the analog video signal frequency in order to form separate and distinct analog audio and video frequencies.

27. A fuel station communication system as claimed in claim 18 wherein said transmitter includes an upstream portion and a differential line driver, a first power supply for said upstream portion and a second power supply for said differential line driver.

28. A fuel station communication system as claimed in claim 27 wherein said receiver includes an downstream portion and a differential line receiver, a third power supply for said downstream portion and a fourth power supply for said differential line receiver.

29. A fuel station communication system as claimed in claim 18 wherein said receiver includes an downstream portion and a differential line receiver, a first power supply for said downstream portion and a second power supply for said differential line receiver.

30. A method for communicating information via analog circuitry to a customer located at a fuel pump, comprising the steps of:

inputting electrical audio and a video analog signals into a transmitter from a remote signal source;

combining the audio and video analog signals; optically isolating at least a portion of the transmitter by converting the combined audio and video analog signals to light signals and reconverting them to electrical signals in order that electrical faults are not propagated along the analog communication system;

applying the reconverted analog electrical signals to a twisted wire pair to transmit them to a receiver; and processing the audio and video analog signals at the receiver to display and announce information to the customer at the fuel pump.

31. The method of claim 30 further including the steps of:

modulating one of said audio and video analog signals to form a modulated analog signal having a frequency above the other of said analog audio and video signals in order that both of said analog audio and video signals have separate and distinct frequencies;

combining said modulated analog signal and the other of said analog audio and video signals to form the combined analog audio-video signal whereby only a single analog signal is left for transmission by said transmitter; and converting the combined audio-video analog signal into separate audio and video signals at the receiver in order that the customer hears and views the information.

32. The method of claim 31 further including the step of electrically isolating the receiver by a second optical coupling step in order that electrical faults are not propagated along the analog communication system.

33. The method of claim 32 further including the step of amplifying the combined audio-video analog signal with a analog line driver for transmission over the twisted wire pair.

34. The method of claim 33 further including the step of powering an upstream portion of the transmitter with a first power supply separately from the analog line driver and receiver.

35. The method of claim 34 further including the steps of receiving the amplified audio-video analog signal at an analog line receiver and powering a downstream portion of the receiver with a second power supply such that the downstream portion is powered separately from the analog line receiver and transmitter.

36. The method of claim 30 wherein said processing step includes passing the high frequency portion of the received audio-video analog signal to a demodulator.

37. The method of claim 31 wherein said modulating step comprises modulating the audio analog signal to a frequency above the video analog signal frequency and summing the modulated audio analog signal and the video analog signal to form the combined analog audio-video signal.

38. The fuel dispensing and fuel station analog communication system of claim 10 wherein said receiver further comprises a highpass isolation unit in order to pass a said high frequency portion of said combined analog signal to said demodulator.

39. A fuel station analog communication system for communicating information to a customer located at a fuel pump, comprising:

a transmitter disposed at a location remote from the fuel pump and having an analog audio input for receiving an analog audio signal and an analog video input for receiving an analog video signal, the transmitter further having an analog audio output for transmitting an analog audio signal and a analog video output for transmitting an analog video signal;

a receiver and a communication unit located at the fuel pump, said receiver adapted for receiving an analog audio signal and an analog video signal transmitted by said transmitter and said communication unit adapted for presenting the audio-video transmissions by display and announcement to the customer located at the fuel pump and communication unit; and a wire pair connecting said transmitter and said receiver and carrying the analog audio and video signals from said transmitter to said receiver.

40. A fuel station analog communication system for communicating information to a customer located at a fuel pump, comprising:

a transmitter disposed at a location remote from the fuel pump and having an analog audio input for receiving an analog audio signal and an analog video input for receiving an analog video signal, the transmitter further having an analog audio output for transmitting an analog audio signal and an analog video output for transmitting an analog video signal, the transmitter further including:

a modulator adapted for modulating one of said analog audio and video signals, and a signal summer adapted for combining the modulated analog signal and the other of said analog audio and video signals to form a combined analog audio-video signal whereby only a single analog signal is left for transmission by said transmitter;

a receiver and a communication unit located at the fuel pump, said receiver adapted for receiving the analog audio-video signal transmitted by the transmitter and said communication unit adapted for presenting said audio-video transmissions by display and announcement to the customer located at the fuel pump; and a wire pair connecting said transmitter and said receiver and carrying the analog audio-video signal from said transmitter to said receiver.

41. A fuel station communication system for communicating information to a customer located at a fuel pump comprising:

a transmitter disposed at a location remote from the fuel pump and having an analog audio input for receiving an analog audio signal and an analog video input for receiving an analog video signal, the transmitter further including an analog audio output for transmitting an analog audio signal and an analog video output for transmitting an analog video signal;

a receiver and a communication unit located at the fuel pump, said receiver adapted for receiving the analog audio-video signal transmitted by the transmitter and said communication unit adapted for presenting audio-video transmissions by display and announcement to the customer located at the fuel pump and communication unit; and a twisted wire pair adapted for use along side AC power lines and having noise and immunity, said twisted wire pair connecting said transmitter and said receiver and carrying the analog audio and video signals from said transmitter to said receiver.

42. A fuel station communication system for communicating information to a customer located at a fuel pump comprising:

an analog transmitter disposed at a location remote from the fuel pump for transmitting an audio-video signal;

a receiver and a communication unit located at the fuel pump, said receiver adapted for receiving the audio-video signal transmitted by said transmitter, said communication unit adapted for presenting the audio-video transmissions by display and announcement to the customer located at the fuel pump and communication unit;

a wire pair connecting said transmitter and said receiver and carrying the audio-video signal from said transmitter to said receiver; and at least one optical coupler disposed between said transmitter and said receiver for electrically isolating said transmitter and said receiver from one another in order that electrical faults are not propagated therebetween.

43. A fuel station communication system for communicating information to a customer located at a fuel pump, comprising:

a transmitter disposed at a location remote from the fuel pump for transmitting an audio-video signal;

a receiver and a communication unit located at the fuel pump, said receiver adapted for receiving the audio-video signal transmitted by said transmitter, said communication unit adapted for presenting the audio-video transmissions by display and announcement to the customer located at the fuel pump and communication unit;

a wire pair connecting said transmitter and said receiver and carrying the audio-video signal from said transmitter to said receiver;

a plurality of separate and distinct power supplies connected to different stages of the communication and supplying electrical power thereto, whereby said transmitter and receiver are protected from electrical malfunction that may occur along said wire pair.

* * * * *